United States Patent
Mead et al.

(10) Patent No.: US 12,469,329 B2
(45) Date of Patent: Nov. 11, 2025

(54) IMAGE IDENTIFICATION, RETRIEVAL, TRANSFORMATION, AND ARRANGEMENT

(71) Applicant: Ancestry.com Operations Inc., Lehi, UT (US)

(72) Inventors: John Mead, San Francisco, CA (US); Dana Jakobson, Hewlett, NY (US); Scott Curtis Doerrfeld, San Francisco, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 410 days.

(21) Appl. No.: 17/961,751

(22) Filed: Oct. 7, 2022

(65) Prior Publication Data

US 2023/0113141 A1 Apr. 13, 2023

Related U.S. Application Data

(60) Provisional application No. 63/253,650, filed on Oct. 8, 2021.

(51) Int. Cl.
*G06V 40/16* (2022.01)
*G06F 16/538* (2019.01)
(Continued)

(52) U.S. Cl.
CPC .......... *G06V 40/172* (2022.01); *G06F 16/538* (2019.01); *G06F 16/5838* (2019.01);
(Continued)

(58) Field of Classification Search
None
See application file for complete search history.

(56) References Cited

U.S. PATENT DOCUMENTS

| 4,501,559 A | 2/1985 | Griswold et al. |
| 4,817,036 A | 3/1989 | Millett et al. |

(Continued)

FOREIGN PATENT DOCUMENTS

| FR | 2814563 A1 | 3/2002 | |
| JP | 2004295648 A | 10/2004 | |
| WO | WO-2018072028 A1 * | 4/2018 | ............. G06F 16/50 |

OTHER PUBLICATIONS

Kim, B. "Interactive and Interpretable Machine Learning Models for Human Machine Collaboration." Dissertation, Massachusetts Institute of Technology, Jun. 23, 2015, pp. 1-143.

(Continued)

*Primary Examiner* — Bernard Krasnic
(74) *Attorney, Agent, or Firm* — Keller Preece PLLC

(57) ABSTRACT

Image identification, retrieval, transformation and arrangement systems, methods, and computer-program products are configured to access a family tree of a user in a family tree database, identify one or more additional persons of interest in the family tree, determine whether the one or more persons of interest is associated with an image, retrieve the image, and transform the image of the one or more additional persons of interest with an image of the user or other person such as in an image arrangement template. Whether an image pertains to a person is determined using a machine learning classifier. A plurality of candidate lineages from a root or self node may be evaluated based on the number and/or quality of images associated therewith and/or based on filtering the one or more characteristics of the nodes in the candidate lineages.

20 Claims, 7 Drawing Sheets

(51) Int. Cl.
*G06F 16/583* (2019.01)
*G06V 10/56* (2022.01)
*G06V 10/75* (2022.01)
*G06V 10/764* (2022.01)

(52) U.S. Cl.
CPC .......... *G06F 16/5854* (2019.01); *G06V 10/56* (2022.01); *G06V 10/751* (2022.01); *G06V 10/764* (2022.01); *G06V 40/168* (2022.01)

(56) References Cited

U.S. PATENT DOCUMENTS

| | | | |
|---|---|---|---|
| 5,455,945 A | 10/1995 | VanderDrift | |
| 5,467,471 A | 11/1995 | Bader | |
| 5,506,865 A | 4/1996 | Weaver | |
| 5,606,653 A | 2/1997 | Gilmore | |
| 6,269,188 B1 | 7/2001 | Jamali | |
| 6,389,429 B1 | 5/2002 | Kane et al. | |
| 6,421,656 B1 | 7/2002 | Cheng et al. | |
| 6,424,983 B1 | 7/2002 | Schabes et al. | |
| 6,427,123 B1 | 7/2002 | Sedlar | |
| 6,501,855 B1 | 12/2002 | Zelinski | |
| 6,523,041 B1 | 2/2003 | Morgan et al. | |
| 6,549,646 B1 | 4/2003 | Yeh et al. | |
| 6,570,567 B1 | 5/2003 | Eaton | |
| 6,658,412 B1 | 12/2003 | Jenkins et al. | |
| 6,760,731 B2 | 7/2004 | Huff | |
| 6,910,050 B2 | 6/2005 | Pawlick | |
| 6,947,933 B2 | 9/2005 | Smolsky | |
| 6,963,871 B1 | 11/2005 | Hermansen et al. | |
| 6,978,271 B1* | 12/2005 | Hoffman | G06F 16/13 707/999.102 |
| 7,014,101 B1 | 3/2006 | Kennedy | |
| 7,151,852 B2 | 12/2006 | Gong et al. | |
| 7,162,430 B2 | 1/2007 | Misawa et al. | |
| 7,181,471 B1 | 2/2007 | Ibuki et al. | |
| 7,249,129 B2 | 7/2007 | Cookson et al. | |
| 7,350,101 B1 | 3/2008 | Nguyen et al. | |
| 7,436,994 B2 | 10/2008 | Huang | |
| 7,702,145 B2 | 4/2010 | Revow et al. | |
| 7,783,565 B1 | 8/2010 | Ajose et al. | |
| 8,095,567 B2 | 1/2012 | Cookson et al. | |
| 8,315,484 B2 | 11/2012 | Meyer et al. | |
| 9,116,882 B1 | 8/2015 | Macpherson et al. | |
| 9,390,225 B2 | 7/2016 | Barber et al. | |
| 9,501,724 B1 | 11/2016 | Yang et al. | |
| 10,140,342 B2 | 11/2018 | Cevahir | |
| 10,318,846 B2 | 6/2019 | Brown et al. | |
| 2002/0032687 A1 | 3/2002 | Huff | |
| 2002/0112230 A1 | 8/2002 | Scott | |
| 2002/0156779 A1 | 10/2002 | Elliott et al. | |
| 2003/0009439 A1 | 1/2003 | Lee | |
| 2003/0014422 A1 | 1/2003 | Notargiacomo et al. | |
| 2003/0135512 A1 | 7/2003 | Morgan et al. | |
| 2004/0064454 A1 | 4/2004 | Ross et al. | |
| 2004/0083226 A1 | 4/2004 | Eaton | |
| 2004/0189691 A1 | 9/2004 | Jojic et al. | |
| 2005/0114364 A1 | 5/2005 | Tebbs et al. | |
| 2005/0116954 A1 | 6/2005 | Ripps et al. | |
| 2005/0147947 A1 | 7/2005 | Cookson et al. | |
| 2005/0149497 A1 | 7/2005 | Cookson et al. | |
| 2007/0168368 A1 | 7/2007 | Stone | |
| 2007/0266003 A1 | 11/2007 | Wong et al. | |
| 2008/0033933 A1 | 2/2008 | Cookson et al. | |
| 2008/0059408 A1 | 3/2008 | Barsness et al. | |
| 2008/0081331 A1 | 4/2008 | Myres et al. | |
| 2008/0130997 A1 | 6/2008 | Huang et al. | |
| 2009/0281978 A1 | 11/2009 | Gordon et al. | |
| 2009/0299598 A1 | 12/2009 | Boecker et al. | |
| 2010/0005078 A1 | 1/2010 | Bayliss | |
| 2010/0049736 A1 | 2/2010 | Rolls et al. | |
| 2010/0287213 A1 | 11/2010 | Rolls et al. | |
| 2011/0085055 A1* | 4/2011 | Matsushita | G06F 16/5854 348/231.3 |
| 2011/0099193 A1 | 4/2011 | Jensen | |
| 2012/0054190 A1 | 3/2012 | Peters | |
| 2012/0078503 A1 | 3/2012 | Dzubay et al. | |
| 2013/0145260 A1* | 6/2013 | Munekuni | G06F 16/58 715/255 |
| 2013/0266194 A1* | 10/2013 | Brookhart | G06F 18/231 382/118 |
| 2013/0268564 A1 | 10/2013 | Cookson et al. | |
| 2014/0181089 A1 | 6/2014 | Desmond et al. | |
| 2014/0244664 A1 | 8/2014 | Verma | |
| 2014/0278138 A1 | 9/2014 | Barber et al. | |
| 2015/0363481 A1 | 12/2015 | Haynes | |
| 2016/0012280 A1 | 1/2016 | Ito et al. | |
| 2016/0048517 A1 | 2/2016 | Jensen | |
| 2016/0275413 A1 | 9/2016 | Shi et al. | |
| 2016/0342863 A1 | 11/2016 | Kwon et al. | |
| 2017/0091692 A1 | 3/2017 | Guo et al. | |
| 2017/0109427 A1 | 4/2017 | Izumi et al. | |
| 2017/0213127 A1 | 7/2017 | Duncan | |
| 2017/0293861 A1 | 10/2017 | Roy et al. | |
| 2018/0189379 A1 | 7/2018 | Phillips | |
| 2019/0362806 A1* | 11/2019 | Ghali | G16B 10/00 |
| 2020/0051271 A1* | 2/2020 | Wexler | G06V 40/28 |
| 2020/0394188 A1 | 12/2020 | Roy et al. | |

OTHER PUBLICATIONS

Langkvist, M. et al. "Interactive Learning with Convolutional Neural Networks for Image Labeling." International Joint Conference on Artificial Intelligence, Jul. 9-15, 2016, pp. 1-5.

Miller, J. "The Philatelic Genealogy Website: Postal History Helping Genealogy, Genealogy Helping Postal History." Philatelic Genealogy, Jul. 19, 2013, 3 pages, [Online] [Retrieved Aug. 4, 2023], Retrieved from the Internet Archive <URL:https://web.archive.org/web/20130719210937/http://philgen.org/>.

Ourworld. "Family Tree Maker Version 8." Ourworld.compuserve.com, Feb. 3, 2002, 7 pages, [Online] [Retrieved Aug. 4, 2023], Retrieved from the Internet Archive <URL:http://web.archive.org/web/20020203125249/ourworld.compuserve.com/homepages/genealogy_supplies/FTW.htm>.

Post, W. et al. "Reconstructing the Extended Kin-network in the Netherlands with Genealogical Data: Methods, Problems, and Results." Population Studies, vol. 51, No. 3, Nov. 1997, pp. 263-278.

Von Ahn, L. et al. "reCAPTCHA: Human-Based Character Recognition via Web Security Measures." Science, vol. 321, No. 5895, Sep. 12, 2008, pp. 1465-1468.

International Search Report and Written Opinion for PCT/US2022/046014, Mailed Feb. 2, 2023, 7 pages.

International Preliminary Report on Patentability for PCT/US2022/046014, Apr. 9, 2024, 5 pages.

* cited by examiner

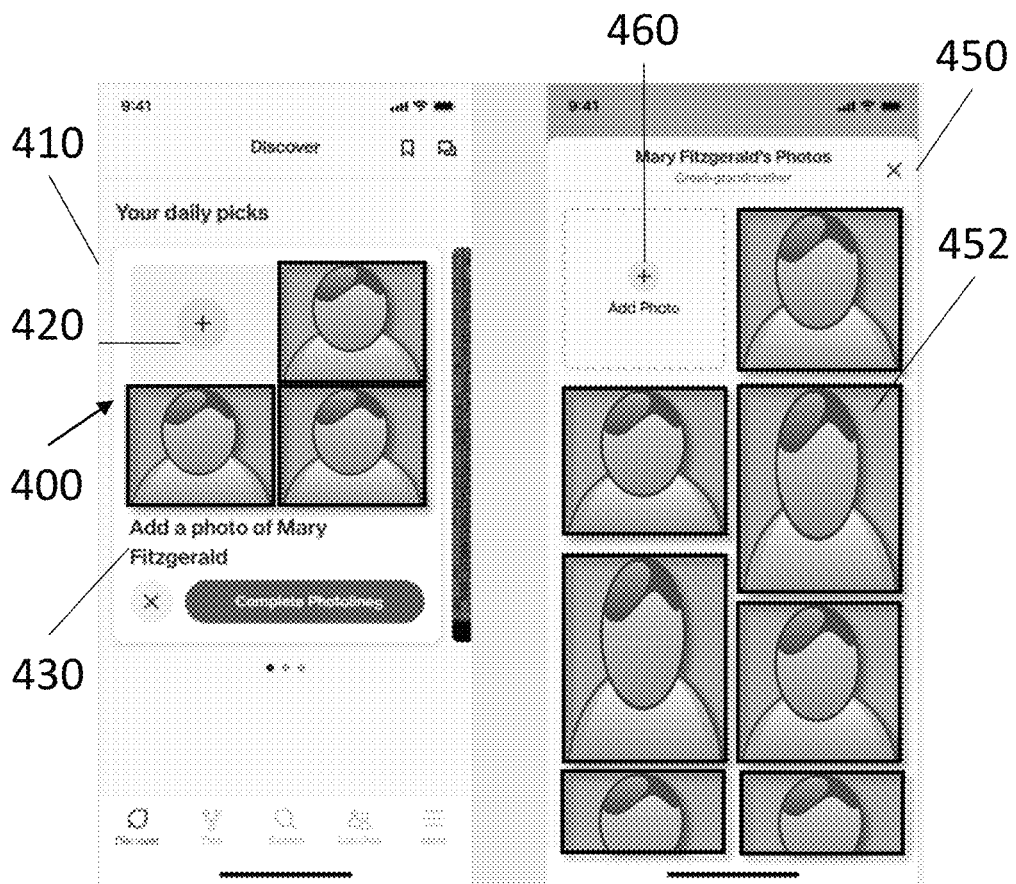
FIG. 4
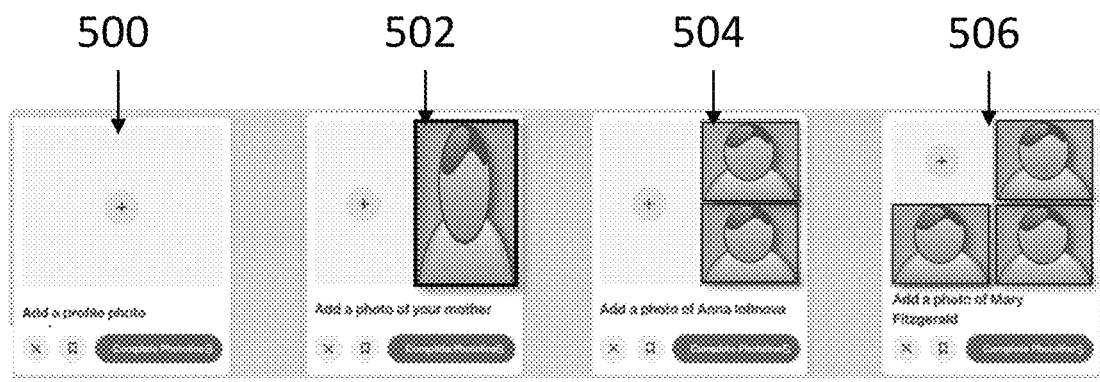
FIG. 5A  FIG. 5B  FIG. 5C  FIG. 5D

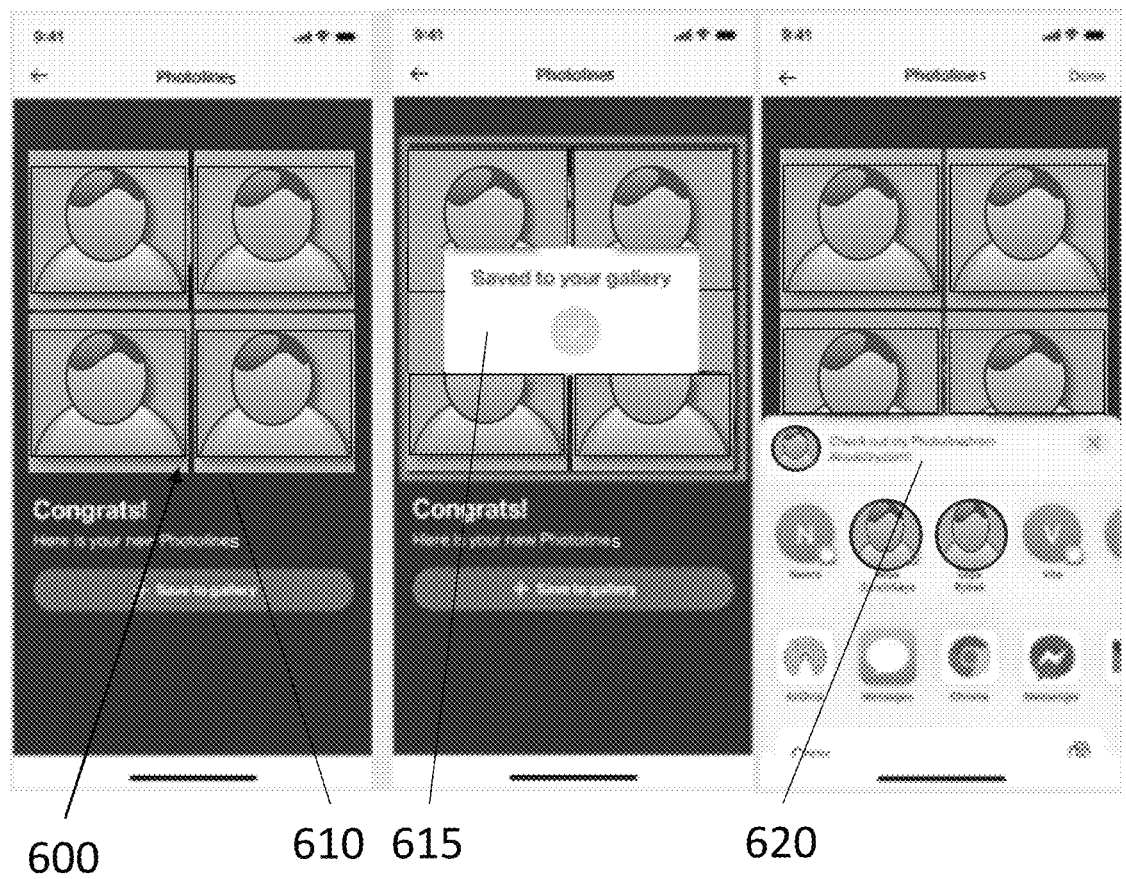
*FIG. 6A*  *FIG. 6B*  *FIG. 6C*

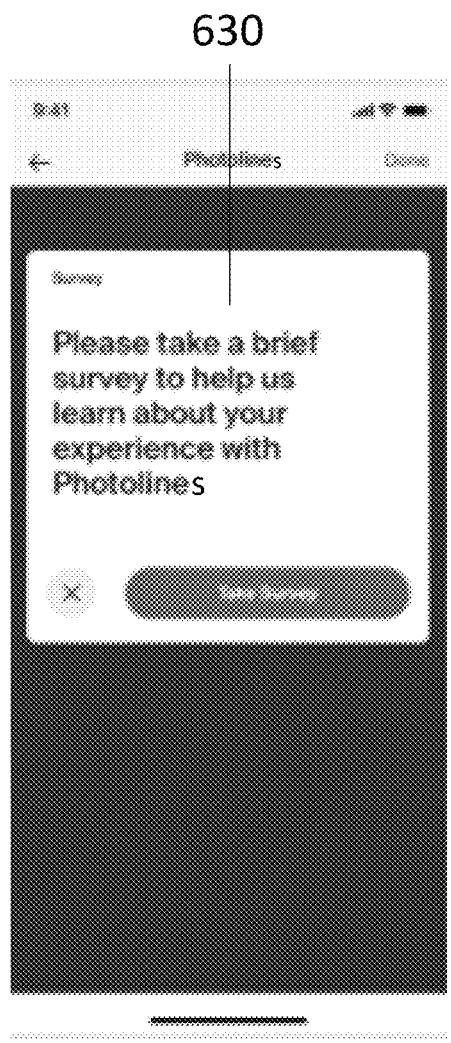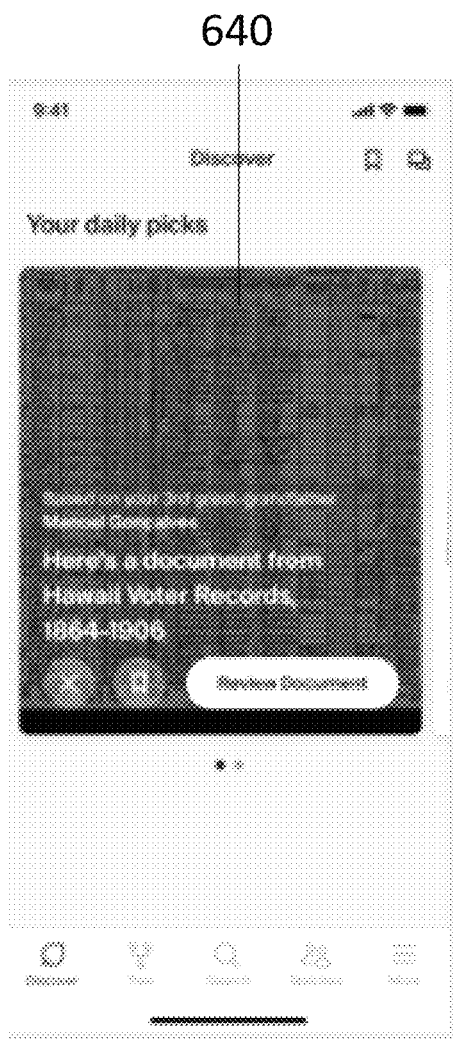
FIG. 6D                    FIG. 6E

IMAGE IDENTIFICATION, RETRIEVAL, TRANSFORMATION, AND ARRANGEMENT

CROSS REFERENCE

This application claims benefit of U.S. Provisional Application No. 63/253,650 by Mead et al, filed on Oct. 8, 2021, entitled "SYSTEM AND METHOD FOR PHOTO IDENTIFICATION, RETRIEVAL, AND ARRANGEMENT," the disclosure of which is incorporated by reference herein in its entirety.

FIELD OF THE DISCLOSURE

The disclosure relates to systems, computer program products, and/or methods for identifying, retrieving, transforming and/or arranging one or more images or other data.

BACKGROUND

As family history research increases in popularity, the desire to understand and see how traits have been shared and inherited across generations has also increased. People are curious about their roots and why they are the way they are, in particular who, among their ancestors, they may have received a particular attribute from. While relatives and acquaintances may remark that a person has "their mother's laugh" or "their grandfather's smile," for example, these are anecdotal observations and often difficult to see, appreciate, or verify.

Genealogical research services allow users to generate family trees populated with information about ancestors, including data like images, records, and other data. These can be viewed when viewing the profile of a single individual, such as a grandparent. Such research services, however, do not provide a user with the ability to intuitively, accurately, and/or automatically juxtapose such information across generations of a family, for example for the purpose of comparing and observing traits as they propagate through descendants.

Even irrespective of the showing of traits, people crave opportunities to feel connected to their family and ancestors. Existing social media and genealogical-research modalities do not provide intuitive and user-friendly opportunities for such connection via data that are available for multiple generations of family members, ancestors, other relatives, and the like.

As users of genealogical research services conduct research, moreover, there is a need for novel and emotionally engaging experiences to encourage the user to continue using the genealogical research service to conduct further research. There is sometimes a high activation energy associated with building a family tree using a genealogical research service, particularly given the daunting amount of information that must be recalled, searched for, and/or identified by a user. This can dissuade new users from progressing through the tree-building process to the point where they are able to realize and enjoy emotionally engaging and enriching experiences therethrough.

In view of the foregoing, there is a need for an improvements in this space.

SUMMARY

Embodiments of systems, computer-program products, and methods for image identification, retrieval, transformation, and arrangement advantageously address the drawbacks of existing approaches by facilitating the automatic identification, selection, transformation, and, in embodiments, arrangement by juxtaposition of different images.

In embodiments, users of a genealogical research service or database will build a family tree or pedigree comprising ancestors and information (such as images, including photos) associated therewith. Image identification, retrieval, transformation, and arrangement system and method embodiments advantageously are configured to navigate the user's family tree, identify pertinent images associated with pertinent ancestors of the user, select, retrieve, and store the images, transform the images, and then arrange the transformed images in a predefined template. The template may be sent to a user. It has been found that automatically producing such arrangements of images creates an emotionally engaging and indelible experience for users, encouraging the users to continue using the genealogical research service. In embodiments, this also encourages users to search for and upload images such as photos for ancestors who are missing images so as to generate a template of images.

In embodiments, the genealogical research service comprises a family tree database in which distinct family trees are stitched together using entity resolution techniques described in at least U.S. Pat. No. 11,347,798, granted May 31, 2022, U.S. Pat. No. 11,113,609, granted Sep. 7, 2021, US Patent Application Publication No. 2020/0394188, published Dec. 17, 2020, US Patent Application Publication No. 2013/0268564, published Oct. 10, 2013, US Patent Application Publication No. 2011/0099193, published Apr. 28, 2011, each of which is incorporated herein by reference in its entirety. The embodiments may advantageously utilize images associated with a direct-line ancestor of the user or other person of interest that were uploaded by a different user, such as a user who is also related in some way to the direct-line ancestor of the user, and clustered together, such as when another user populates a tree node for the same person and said person and data associated therewith are clustered together with the user's own entry. This allows the embodiments to leverage a much larger number of images and other data for the generation of image arrangements than would be possible using only the user-provided data.

The system and method embodiments comprise one or more rule-based approaches and/or machine learning models for determining whether an image associated with an ancestor is an appropriate image, such as a portrait photo showing the ancestor's face. The rule-based approaches and/or machine-learning models may apply a suitable face-detection approach for assessing that the image contains a face of the ancestor, and upon determining that the image contains a face, trigger the embodiments to select such image and retrieve and store the image. This can advantageously be performed on-the-fly, upon request, in volatile memory, and/or in advance. For example, this can be performed on-the-fly each time a user submits a login request to the genealogical research service.

The embodiments further facilitate one or more rule-based approaches and/or machine learning models for appropriately sizing and arranging the retrieved images into a predefined template or other arrangement. An exemplary template is a four-by-four grid of images, arranged oldest to youngest and proceeding left to right and top to bottom. For a male user for whom the embodiments have identified a father, grandfather, and great-grandfather in a family tree having images associated therewith, a resulting image arrangement includes a four-by-four grid of images with the great-grandfather in the top left, the grandfather in the top right, the father in the bottom left, and the male user in the bottom right slots, respectively. Advantageously a user may thus observe the passage across generations of certain traits, such as a resemblance between related persons in general, and/or a shared nose, eyes, chin, and/or other features as the case may be, lending credence to anecdotal observations that the user inherited their "grandfather's nose," for instance.

The generated image arrangement may be determined in the background, e.g. by a specialized computer system, and then sent to and displayed on a user device as a first card among cards showing possible findings of interest when the user is using the genealogical research service. The embodiments may receive and respond to a user request to save, dismiss, or share the generated image arrangement. In embodiments, the image arrangement may be clicked on and viewed, saved to the image gallery portion of the user's profile and/or the pertinent ancestors' profiles, shared on social media, attached to messages or emails, or otherwise.

Because of the disparity in image availability for different tree persons in a family history database, image arrangements can be developed by skipping one or more generations, such as a generation where an image of the corresponding ancestor is not available. Image arrangements may be built stepwise, with new and more extensive (i.e. including more images/more ancestors) image arrangements generated according to the embodiments as additional and/or better images become available. While two, three, and four-person image arrangements comprising related persons of the same biological sex are discussed, it will nevertheless be appreciated that the disclosure is not limited thereto and image arrangements with persons of different biological sexes and different numbers may likewise be generated. While direct-line ancestors have been described, image arrangements may be generated using any suitable persons' images and any other types of data or records, including videos, audio recordings, documents, or otherwise. For example, image arrangements may be generated for siblings, avuncular relations, parent(s)+child(ren), children or grandchildren only, grandparents only, grandparent(s)+grandchild(ren), cousins, or any other suitable combination of any number of individuals.

To encourage users to add images for themselves and/or to ancestors' profiles, in embodiments a partially completed image arrangement may be generated and sent to a user. The partially completed image arrangement may include a template as described herein wherein one or more of the direct-line ancestors or other persons included does not have a suitable image for the arrangement in a respective profile or gallery. In its stead, an icon or any suitable indicator may invite a user to add an image to complete the arrangement, i.e. to fill in the generation gap. If the user, the user's mother, and the user's grandmother all have suitable images in the genealogical database but the great-grandmother does not, the provision of a partially completed image arrangement with the icon in the great-grandmother's place in the template encourages a user to intuitively add a pertinent image, e.g. by uploading the image to the genealogy database by clicking on the icon. This benefits the genealogical research service, in turn, as the provided information enhances the genealogy research and exploration experience for anyone who may have that ancestor in their tree, as this may, in some instances, become available to other users of a stitched tree database.

The icon may direct the user to the image gallery of the pertinent tree person, in the above example the great-grandmother's profile's image gallery or photo gallery. Once the user has uploaded an image, the system and method embodiments may prompt the user to save the image arrangement to one or more galleries, e.g. the image galleries of persons shown in the image arrangement, and/or to share the image arrangement. For instance, the user may be prompted to generate an ephemeral or non-ephemeral story based on or including the transformed images and/or image arrangement.

In embodiments, the nearer generations are prioritized. For example, if the genealogical research service has images for the self (female), a great-grandmother, and great-great-grandmother, the embodiments may prioritize the mother over the grandmother and invite the user to complete the template using the mother's image (thereby skipping the grandmother's generation). In an embodiment, the user may not yet have added an image of/for themselves, and/or has not selected a profile picture. Additionally, an image may be missing for, e.g., the user's grandparent. The user may be invited to complete the template using their own image (to add to the template along with the existing and retrieved images of the parent and great-grandparent, for example), as opposed to their grandparent's image. In subsequent image arrangements, the grandmother may be presented as the missing link so as to invite the user to add an image of the grandmother. In embodiments, the missing generation (i.e. the mother and grandmother) each count as a "spot" and the next image in the line may be up to one generation away from the requested image.

In embodiments, the system and method embodiments determine, by tracing a user's family tree according to one or more predefined paths, how many images are available for generating an image arrangement. This determination leads to a selection of a suitable template. For a user whose family tree includes suitable images for only two generations (e.g. self and parent), for example because the user has only built their tree out to two generations or likely tree persons for additional generations with associated data such as images cannot be identified, a template with two spaces for images will be provided as opposed to a template with three or four spaces for images.

The system and method embodiments may then determine whether the two generations and the tree persons therein have suitable images associated with them to support a template with two spaces. In embodiments, this determination is done simultaneously. By contrast, for a user who has built their family tree out three, four, or more generations, the system may determine whether there are sufficient images associated with persons along predefined or dynamically determined paths in the family tree to fill out a template with three, four, or more spaces, and subsequently or simultaneously determine whether there are sufficiently many images in the tree and along predefined or dynamically determined paths to fill out the template. The system and method embodiments may be configured to utilize a stitched tree database, for example the stitched tree database described in US Patent Application Publication No. 2020/0394188, published Dec. 17, 2020, US Patent Application Publication No. 2022/0253484, published Aug. 11, 2022, each of which is incorporated herein in its entirety by reference. The stitched tree database may facilitate the determination of an ancestor or relative, identification of one or more data such as images associated therewith, and/or automatically retrieve and/or transform the same for use in an image arrangement according to embodiments.

In embodiments, as a user continues to build out their tree, the system and method automatically reprocesses the image arrangement, adding generations as suitable and as suitable images are detected. The system and method may be configured to encourage the user to build out their family tree by selecting and populating a template with the next generation suggested for adding an image. Thus, for example, after a user completes themselves and their parents in their family tree, an image arrangement may be provided with three spaces, two that include self and parent, and a third inviting the user to add their grandparent. Similarly, when the user completes the third generation comprising one or more grandparents, an image arrangement may be generated with four spaces, with the fourth space inviting the user to add their great-grandparent.

In instances where a user has yet to add a profile image for themselves, the system and method embodiments begin with an "add profile photo" card or prompt. If the user then adds a profile image, immediately a two-image template may be populated with the user's profile image and the other side of the template invites the user to add another image, e.g. of their parent, to complete a connection or line between two generations. This may advantageously be performed or utilized to encourage a new user to build out their pedigree for the first time upon using the genealogical research service. The genealogy database may advantageously perform the recommendation of names for additional generations automatically; that is, a user may be determined to be related to certain persons based on one or more historical records or existing family trees in the genealogy database, e.g. within a stitched family tree database.

This is enabled, in embodiments, by the use of a stitched tree database, which brings to bear greater volumes of information and data than any one user could provide or know on their own. Thus a user may begin the process of building a tree by adding their name and their parents' names and optionally other biographical data, whereupon the system automatically determines the likely names of their grandparents from the stitched tree database and/or from one or more historical records such as Censuses, and so on for great-grandparents and great-great-grandparents. As many users who first visit such a genealogical research service often stop using the service in the very early stages of building out a tree or exploring record collections to discover insights into their family, and thus fail to experience emotionally engaging insights thereon, improved methods of providing such insights early in the onboarding process are particularly advantageous. Indeed, this process of guiding a user through "tree building" while providing the indelible impressions provided by the identification, transformation, and juxtaposition of images of ancestors advantageously encourages deeper engagement by a user.

Thus, in embodiments, the system and method embodiments can suggest an image of an ancestor, based on images existing in the stitched tree database, along with a name, determined to be likely ancestors of the user or other persons of interest for the user, for the user to approve. This can expedite the process of generating an image arrangement and family tree for the user as the user can be guided on the process of building the family tree with information previously unknown to the user, and minimizes the activation energy needed for the user to seek out and upload or otherwise identify an ancestral image.

Upon generating an image arrangement according to the disclosed embodiments, the image arrangement may be assigned an identification constructed or concatenated from each person id in the image arrangement, the identification serving to keep records of a user's activity on their image arrangements and to reconstruct a particular image arrangement on demand in the future if the need arises. The user may have multiple such image arrangements generated based on their tree data.

The face detection model may be used to center any detected faces within an image and to crop and appropriately scale and/or size an image according to a predefined template. This allows for the provision of a relatively uniform viewing experience for the user despite the original state of the images, as the only extant images of a great-grandparent may be a family photo comprising a plurality of faces or a yearbook page in which the person of interest is a relatively small part. As it may be difficult for a user to discern shared traits even if such a family image is juxtaposed with their own profile image, the system and method embodiments advantageously allow for detecting a face and focusing an image on the pertinent face such that the faces are of a substantially uniform size in the image arrangement.

These and other features of the present disclosure will become better understood regarding the following description, appended claims, and accompanying drawings.

BRIEF DESCRIPTION OF THE DRAWINGS

FIG. 4 is a user interface for adding an image to an image arrangement generated according to an embodiment of the present disclosure.

FIG. 5A is an image arrangement prompting user image upload generated according to another embodiment of the disclosure.

FIG. 5B is an image arrangement prompting user image upload generated according to another embodiment of the disclosure.

FIG. 5C is an image arrangement prompting user image upload generated according to another embodiment of the disclosure.

FIG. 5D is an image arrangement prompting user image upload generated according to another embodiment of the disclosure.

FIG. 6A is a user interface showing an image arrangement generated according to an embodiment of the disclosure.

FIG. 6B is a user interface according to an embodiment of FIG. 6A.

FIG. 6C is a user interface according to an embodiment of FIG. 6A.

FIG. 6D is a user interface according to an embodiment of FIG. 6A.

FIG. 6E is a user interface according to an embodiment of FIG. 6A.

Figure 1:
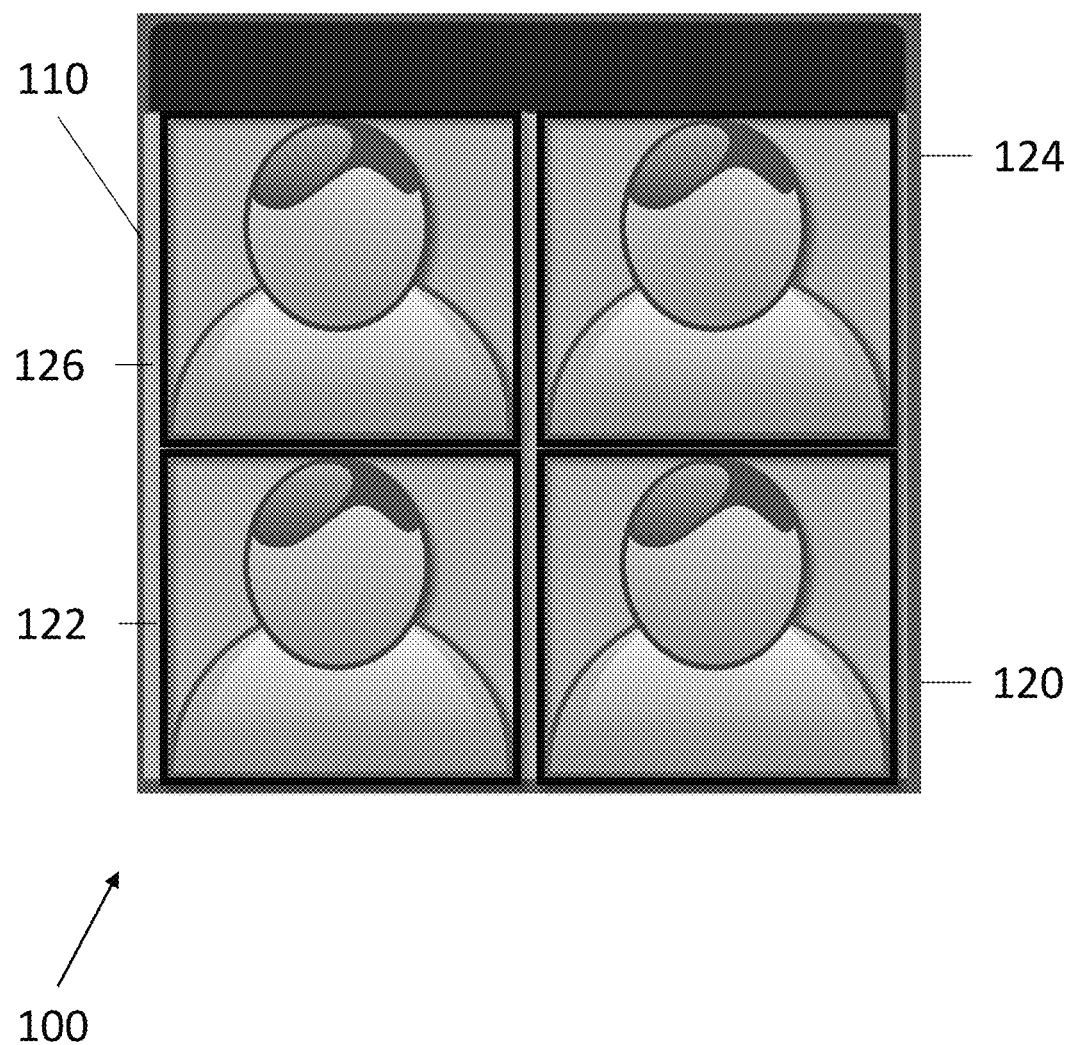
FIG. 1 is an image arrangement generated according to embodiments of the present disclosure.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of image identification, retrieval, transformation, and arrangement systems and methods, and in no way limit the structures, configurations, or functions of image identification, retrieval, and arrangement systems and methods and components thereof according to the present disclosure.

DETAILED DESCRIPTION OF VARIOUS EMBODIMENTS

A. Introduction

Although the embodiments of the disclosure are adapted for providing image identification, retrieval, and arrangement systems and methods in genealogical databases and services, it will be appreciated that the principles of the disclosure may be adapted to any suitable application. Image identification, retrieval, and arrangement systems and methods may be provided for users of any social networking application or other networking application, and are not limited to images or direct relatives.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of image identification, retrieval, transformation, and arrangement system and method, certain modules and features are described independently. The modules and features may be synergistically combined in embodiments to provide an image identification, retrieval, transformation, and arrangement system and method.

B. Embodiments of Systems, Methods, and Computer-Program Products for Image Identification, Retrieval, Transformation, and Arrangement Embodiments of image identification, retrieval, transformation, and arrangement systems and methods address shortcomings in the art by providing an automated approach to identifying, from a database such as a stitched genealogical tree database and using one or more selected predefined candidate lineages, one or more images suitable for an image arrangement such as one juxtaposing faces, retrieving the images, and transforming the images to be suitable for an image arrangement.

Turning to FIG. 1, an image arrangement 100 generated automatically according to disclosed embodiments is shown and described. The image arrangement 100 comprises a plurality of individual images 110, each of which may represent a tree person from a different generation in a family tree. In embodiments, the individual images 110 are selected based on a relationship e.g. of a male user to a target person 120, such as a father 122, grandfather 124, and great-grandfather 126.

Each of the images 110 may be automatedly cropped and focused, e.g. by appropriately scaling, sizing, and cropping, such that faces of the individuals represented therein are of a comparable size and/or centered within the individual image. That is, one or more images may be cropped and scaled such that a face within an image is substantially a same size as a face within another image in the image arrangement. Additionally or alternatively, the images may be automatically cropped and sized based on dimensions of a predetermined template. For example, an oval or circular image may be cropped and sized as a rectangular image of dimensions suitable for use in a rectangular grid as shown in FIG. 1, and vice versa. While the arrangement of oldest to youngest from left to right and top to bottom within a rectangular grid is shown, any arrangement may be used as suitable. A suitable machine learning model or rule-based approach, such as a face detection model or algorithm, may be used to determine that the individual images contain an image of a face.

The model or system may be configured not only to determine whether an image comprises a face but also whether the face is oriented in a suitable direction or manner; for example, if the user's profile picture shows the user smiling, the model or system may be configured to prioritize images of ancestors smiling. If the user's profile picture shows the user looking in a certain direction, the model or system may be configured to determine whether the person is looking in a similar direction. In embodiments, images of persons of interest, such as ancestors, may be selected such that the images are of the persons of interest at similar ages to the user.

Figure 2:
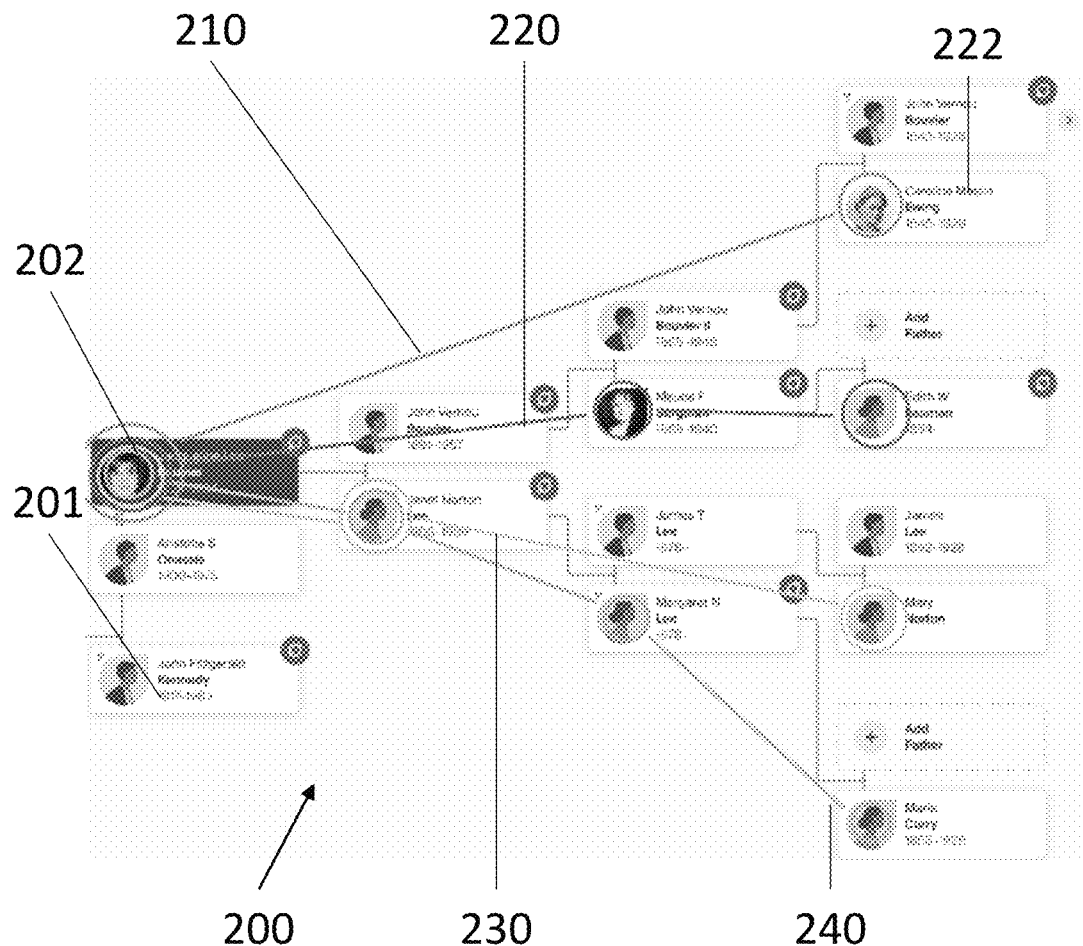
FIG. 2 is a family tree with predefined candidate lineages according to another embodiment of the present disclosure.

Turning to FIG. 2, a pedigree or family tree 200 is shown using which candidate lineages 210, 220, 230, 240 may be determined. The family tree comprises tree nodes 201 including a self 202, who may be the user to or for whom the image arrangement 100 may be targeted/generated. The family tree may be a pedigree within a stitched family tree database or otherwise built using a genealogical research service, and may be accessed from and/or modified within a genealogical database.

The tree nodes 201 may represent profiles of individuals in a family tree and may include or be associated with images, such as in a photo gallery component of the corresponding profile, as well as other biographical information. The system and method embodiments may utilize biographical information about the self 202 to determine a characteristic such as the biological sex of the user and from there determine one or more candidate lineages 210, 220, 230, 240 including, in embodiments, direct-line ancestors 222 of the same or suitable characteristic, such as a same biological sex, as identified from/within the family tree 200. So a mother of the self 202 (a female), a grandmother, and a great-grandmother in a same direct ancestral line may be included in an image arrangement having four spaces for images if suitable images are determined to be attached to the pertinent profiles in the candidate lineage. In embodiments, images that contain a face may be selectively identified and retrieved for use or inclusion in the arrangement. In embodiments, only one person per generation is included in an image arrangement.

Figures 3A, 3B, 3C:
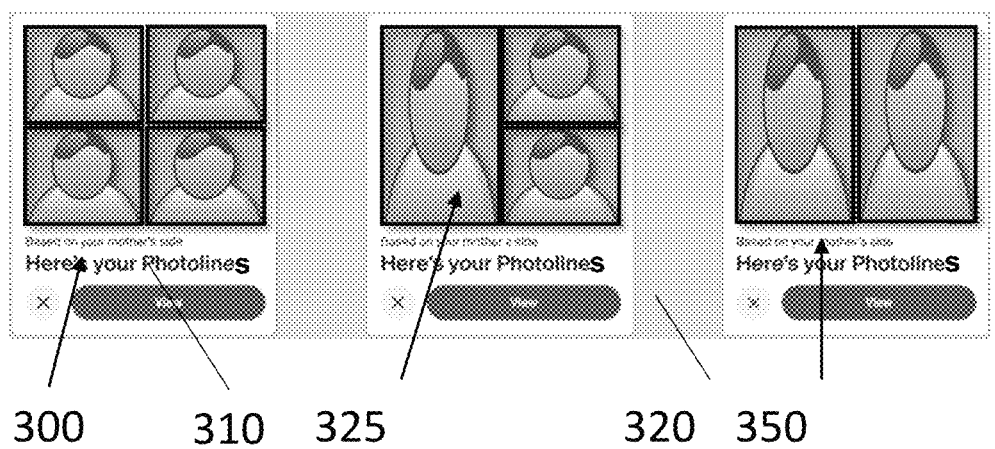
FIG. 3A is an image arrangement generated according to an embodiment of the disclosure.
FIG. 3B is an image arrangement generated according to another embodiment of the disclosure.
FIG. 3C is an image arrangement generated according to another embodiment of the disclosure.

FIGS. 3A-3C show embodiments of image arrangements 300, 325, 350 comprising a different number of images and generations. The image arrangement 300 includes four generations, the image arrangement 325 includes three generations, the image arrangement 350 includes two generations, which may be separated from each other by two generations. That is, in the image arrangement 350, a self and a grandmother are shown. In embodiments, any number of generations may be skipped.

The image arrangements 300, 325, 350 may include an icon 310 with information about the candidate lineage selected (e.g. a mother's side of the family as opposed to the women on the father's side of the family), and/or a selectable option 320 for viewing, saving, or forwarding the image arrangement as desired. The images may be arranged in predetermined templates corresponding to a number of generations and images included, and while a square arrangement is depicted, any suitable arrangement may be used.

For example, other embodiments may include an image arrangement where a base or starter node, often corresponding to a user, is located substantially in a center of an arrangement of images, with images of relatives on both sides of their family (e.g. corresponding to mother and father) extending on either side of or around the user's image. The image of the user may be disproportionately larger relative to the other images, smaller than the other images, or a same size as the other images. Subsequent generations, e.g. grandparents and great-grandparents, may be sized smaller than the user and/or their parents, in embodiments. Labels indicating name or other data may be attached to, overlaid, or otherwise associated with one or more of the images.

The images may be arranged in a grid, in a series or arrangement of adjacent hexagons, in an asymmetrical or random arrangement, in a linear fashion (e.g. from oldest to youngest, or from youngest to oldest), with images comprising more than one person (e.g. with images of both grandparents, both parents, multiple children, parent(s)+child(ren), an entire family in a group photo, etc.), with multiple images of a single person (e.g. showing the person at different ages), in embodiments with multiple images of a single person juxtaposed with multiple corresponding images of another person, with composite images showing one or more images of the image arrangement overlaid on one another for comparison/contrast, with a self node compared against persons from generation(s) away, such as their four grandparents or eight great-grandparents, with images arranged so as to resemble a pedigree, with indicia of the structure of a pedigree overlaid onto the images, with images arranged so as to resemble a page of a scrapbook, with one or more portraits, drawings, or other artistic depictions of a person in place of a photo, combinations and/or modifications thereof, or in any other suitable fashion.

Turning to FIG. 4, an interface 410 of a genealogical research service is shown, whereon an image arrangement 400 generated according to embodiments displayed thereon for a user to view when opening or entering the genealogical research service. The image arrangement 400 includes an icon 420 where an image is missing, e.g. not able to be identified automatedly from/using the genealogical database, and a corresponding indicator 430 showing the name of the missing image, in this case a great-grandmother's profile which has been determined to lack a suitable image. By selecting the icon 420, a user may be directed to an interface 450 corresponding to an image gallery of the person missing a suitable image. The interface 450 can comprise one or more images 452 and an icon 460 for uploading additional images.

Turning to FIGS. 5A-5D, examples of image arrangements 500, 502, 504, 506, respectively, are shown according to embodiments of the disclosure. The image arrangements 500, 502, 504, 506 are configured for different numbers of generations, ranging from a single generation image arrangement 500 (such as for the user to add an image of themselves in the initial stages of building a tree) shown in FIG. 5A, to two generations in the image arrangement 502 in FIG. 5B, to three generations in the image arrangement 504 in FIG. 5C, to four generations in the image arrangement 506 in FIG. 5D. Each may invite the user to upload an image and may identify the name of the ancestor or other person for whom an image is requested. This may advantageously allow a user to iteratively direct the identification, retrieval, transformation, and arrangement of images.

In embodiments, FIGS. 5A through 5D may represent the iterative generation of an image arrangement, combining in embodiments the input(s) and specification(s) of a user with automated determinations, transformations, and selections by a computing system configured to generate image arrangements. For example, after adding an image for a base or starter node in the image arrangement 500, the system may determine that, in the image arrangement 502 of FIG. 5B, an appropriate addition to the image arrangement 500 would be a mother of the person corresponding to the base node. This may be based on, for example, the person corresponding to the base node being a female (as determined using metadata, biographical information in the corresponding profile, or otherwise) and/or the mother of the person corresponding to the base node being identified from the genealogical database, such as from a stitched tree database, a historical records collection, or otherwise. This may be performed based on a user's entry of the mother's name and/or based on identifying the mother from records pertaining to the user or person of interest.

The system may determine that, for an image arrangement 504, an appropriate next node is a particular person, such as a grandmother, and may identify, from a pedigree, such as a pedigree identified within the stitched family tree database and/or from a historical record in the genealogical database, that the grandmother is a person named, e.g., Anna Iofinova. The image arrangement 504 may display an icon and/or indicium prompting the user to add an image to the genealogical research service for the particular person so as to continue generating the image arrangement. Likewise, the system may determine that for an image arrangement 506, an appropriate next node may be a great-grandmother, and may identify, from a pedigree that the great-grandmother is a person named, e.g., Mary Fitzgerald, and may prompt the user to select that person and/or to select or add an image corresponding thereto.

In the determination of the appropriate next node, a plurality of candidate lineages may be interrogated, with images corresponding to nodes thereof accessed and assessed to determine suitability for inclusion in an image arrangement according to embodiments. This may entail, in embodiments, passing the images to a machine learning model such as a classification model as described herein, which may be configured to apply a predicted tag corresponding to a category of images (such as "person") as well as a confidence associated with the applied tag.

The system may determine that a particular candidate lineage of a plurality of generated candidate lineages should be selected based on a proportion of nodes therein with images pertaining to persons with a suitably high confidence. By selecting a candidate lineage, the system may then guide a user to iteratively create an image arrangement by suggesting additional persons from that lineage to add images for (e.g. by user upload or by user selection of an image from a plurality of available images, such as images in an image gallery or identified from a cluster of a stitched tree database for that person) or for the user to select to be included in the image arrangement.

The system may additionally or alternatively perform one or more suitable transformations to the selected or uploaded images, including transforming a size, shape, and/or scale of the image so as to fit within a space of an image arrangement template, such that a size or other feature of a face of the image matches face(s) of other image(s) in the image arrangement, or transforming a color scheme of the image such that one or more images in the image arrangement have matching color schemes. For instance, one or more of the images in the image arrangement may be adjusted with each iteration of the image arrangement so as to accommodate additional images within the arrangement, e.g. based on a changing or updated template. From 502 to 504, for example, the profile image for the user or person of interest may be rescaled from a two-image side-by-side configuration to a three-image configuration as shown.

It will also be appreciated that the user may conclude the iterative image-arrangement generation process at any of the stages 500, 502, 504, 506, by clicking, for example, a "complete" button. The system may automatedly adjust a template and/or a configuration and/or size and/or scale of one or more of the selected nodes and images based on the user completing the image arrangement at a particular stage.

FIGS. 6A-6E show a progression of a user interface 610 comprising an image arrangement 600 automatically generated according to the embodiments. The user interface 610 allows a user to select an icon 611 to save an image arrangement to an image gallery of a profile, e.g. their own profile. This is confirmed at 615. At 620, options for sharing the image arrangement can be overlaid or otherwise presented. At 630 a survey may be presented, and at 640 the interface returns to an original configuration.

Figure 7:
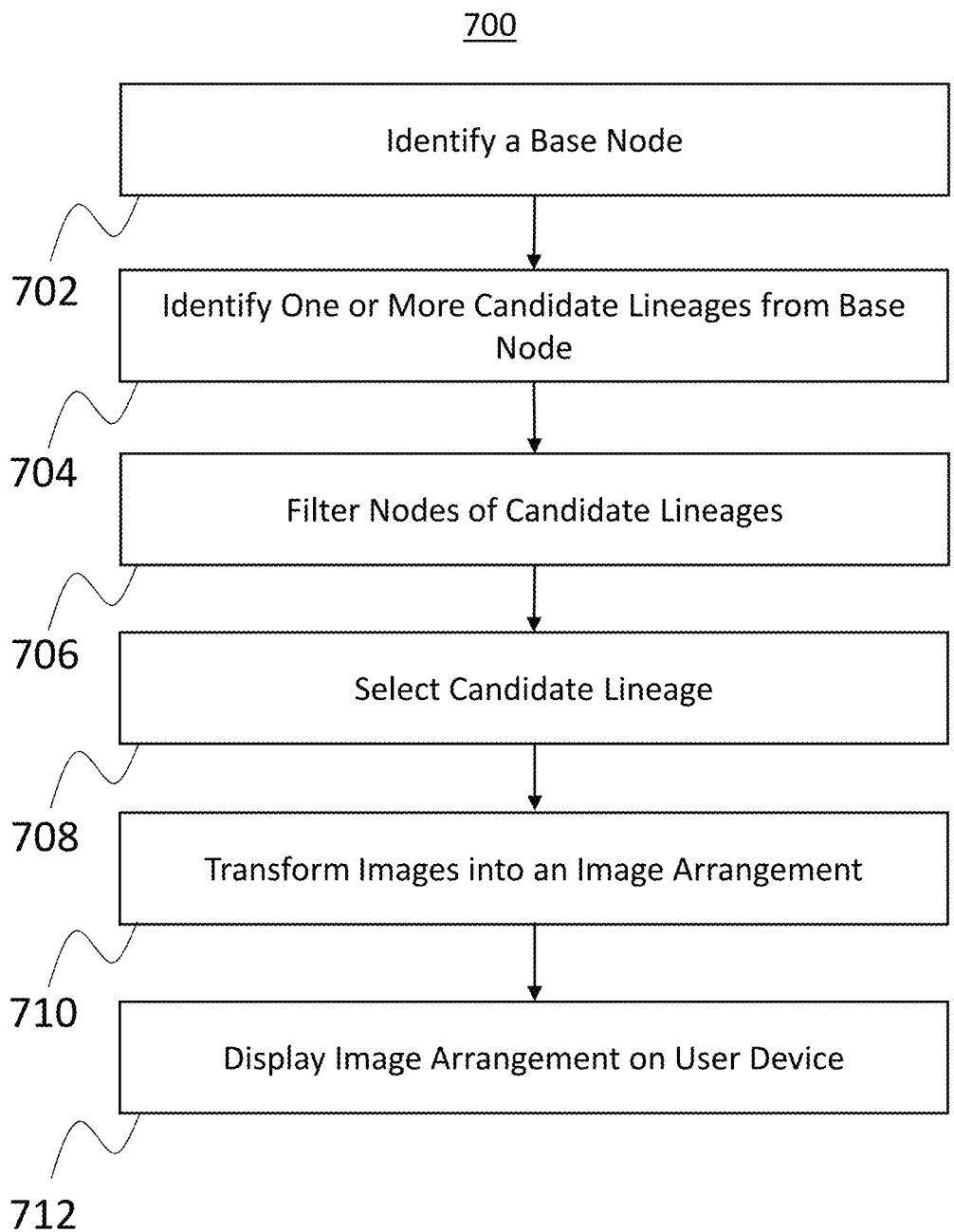
FIG. 7 is a diagram of a computer-implemented method according to an embodiment of the present disclosure.

FIGS. 7A and 7B illustrate an exemplary method of image identification, retrieval, transformation and arrangement. The method 700 may be performed by a computing device. The method 700 may be embodied as a software algorithm that may be stored as computer instructions that are executable by one or more processors. The instructions, when executed by the processors, cause the processors to perform various steps in the method 700. One or more steps in the method 700 may be skipped, added, or changed in various embodiments. While the method 700 and related discussion in this disclosure are illustrated using genealogy records and related images as examples, the method 700 and various embodiments described in this disclosure may also be used for other types of data records with or without images without the loss of generality. The categories, metadata, fields, and image types that are specific to genealogy records may be replaced with corresponding things in other types of data records in other embodiments.

The method 700 includes a step 702 of identifying a base node of a pedigree built using, accessed in, or retrieved from a genealogical tree database or genealogical research service, such as a pedigree corresponding to or including a self or a user, from which to navigate and identify one or more candidate lineages. Identifying a base node may include accessing a pedigree of or including a particular person, whether for a user or for a person of interest specified by the user, from the genealogical database, and identifying a node corresponding to the person of interest such that the identified node may serve as a base, "self," or starter node for an image arrangement. "Lineage" as used herein may relate to a sequence of persons in a direct-line ancestral line as reflected in a pedigree, or a grouping of individuals based on a suitable family (whether biological or non-biological) or other bond, such as a user-specified bond.

In embodiments, first the self node is established to denote a user or other specified individual, and if there is no self node, the system and method embodiments fall back to a root node (i.e. the home person in a particular family tree, e.g. a user's family tree). In the absence of a self or root node, an image arrangement may not be automatedly generated for a particular user's own pedigree absent user involvement, e.g. specification of a different pedigree or specification of another person of interest or iterative generation of an image arrangement with the user specifying or adding persons, lineages, and/or images. While in embodiments an image arrangement may be generated with a user as the default self node, it will be appreciated that the image arrangement may also be generated with a person other than a particular user as the "start," "self," or "base" node, which terms may be used herein interchangeably. The user may specify the person from or for whom to generate the image arrangement, such as a sibling, spouse, child, parent, or other person of interest.

A step 704 includes identifying one or more candidate lineages extending from the base node and including at least one additional node comprising or corresponding to a person other than the person of interest. The identification of candidate lineages may be performed based on a selection of a predetermined image template from a plurality of predetermined image templates. The image template selected may have four spaces for images arranged in a 2×2 grid, as shown in FIG. 1, for example. While predetermined candidate lineages are discussed in some embodiments, it will also be appreciated that in embodiments candidate lineages may be determined on-the-fly, as appropriate.

Other arrangements and numbers of image spaces are contemplated. The identification of candidate lineages may be performed based on the number of spaces in the selected template. Where a 2×2 grid of images is selected, four images (including the base node) should be selected. Where, by contrast, a 3×3 grid or other arrangement is selected, a different number of images should be identified. Candidate lineages are generated/identified accordingly so as to identify sufficiently many nodes having desired shared characteristics and images associated therewith so as to populate the template.

Additionally, or alternatively, candidate lineages may be identified based on an identity assigned to a particular space in a particular template. For example, a template may specify that four consecutive generations in a direct ancestral line should be selected, e.g. self, parent, grandparent, great-grandparent; or child, self, parent, grandparent; or grandchild, child, self, parent; with or without biological sex specified, and etc. Based on the identity or role assigned to particular spaces of particular templates, one or more candidate lineages that extract the specified persons may be generated.

For example, where a template specifies spaces for child, self, parent, grandparent, candidate lineages that include one of the user's children, the user, one of the user's parents, and one of the user's grandparents in varying combinations may be generated by traversing the associated family tree using the rules particular to a selected template, including specified roles and/or number of image spaces, among other possibilities. Roles may be identified using metadata assigned to nodes of the user's family tree which specify a relationship to another node, using a historical record, using a stitched tree database, or in any suitable manner.

For example, if the self node is a male, and the selected image-arrangement template includes a 2×2 grid of images of biological sex-specific individuals in consecutive generations of a direct ancestral line (such as father, grandfather, etc.), the following candidate lineages may be selected:

Base→Father→Father→Father
Base→Father→Father→Mother→Father
Base→Father→Mother→Father→Father
Base→Mother→Father→Father→Father In embodiments, the candidate lineages are generated so as to include sufficiently many nodes having desired shared characteristics despite intervening nodes that do not meet the characteristics and/or to account for nodes that do not have suitable images associated therewith. In embodiments, the step 704 may additionally include determining or specifying a characteristic, such as a biological sex, of the base node tree person and/or of an image arrangement template and optionally image spaces corresponding thereto.

Candidate lineages may be generated for a plurality of image-arrangement templates. In embodiments, one or more of a "generational" image-arrangement template specifying biological sex-specific individuals in consecutive generations of a direct ancestral line, a self+siblings image-arrangement template, a self+spouse+child(ren) image-arrangement template, a children-only image-arrangement template, modifications thereof, and any other suitable template may be selected and utilized, with candidate lineages generated for each selected template.

A step 706 may include filtering one or more nodes or candidate lineages based on any suitable criterion/criteria. Such criterion/criteria may include, without limitation, specifying that nodes and/or lineages must include blood relatives, may include non-blood relatives, must be of a same biological sex, may be a mixture of biological sexes, must be of a particular generation (e.g. all children of a particular parent(s), must skip a particular generation (e.g. grandchild(ren) and grandparent(s) only, must be only of one side of a family, must juxtapose two sides of a family, etc.

The step 706 may include filtering out one or more candidate lineages having nodes of that are a different characteristic, such as biological sex, than the base node, with each remaining lineage becoming a candidate lineage. This may be utilized, in particular, for embodiments wherein the image arrangement pertains specifically to only individuals in consecutive generations of a direct ancestral line having a same biological sex. The step 706 may include aggregating identifying information for nodes that are within the candidate lineages. For example, the name and the primary photo or primary image of a node may be aggregated. Other data, such as metadata about images associated with the node, relationship between the node and the node of the person of interest, or otherwise may also or alternatively be aggregated.

In embodiments, images and nodes corresponding thereto may be selected for inclusion in the image arrangement based on a similarity of a plurality of images. For instance, a candidate lineage may be selected based on a similarity of images associated with nodes therein to the base or starter node. The similarity may be determined between the images as a whole or between faces detected therein. The similarity determination may be made using, e.g., Apple Vision framework available from Apple Inc. of Cupertino, CA. The step 706 of filtering out one or more candidate lineages may thus include, in embodiments, filtering based on similarity between images, e.g. an image of the base node and an image for one or more additional nodes in a candidate lineage. Higher similarities may be preferred.

The step 706 may include, for each node of a candidate lineage, determining if a suitable user-uploaded or other image is present in the gallery. First the node is checked for a primary image or "profile picture"; if none is found, the respective media gallery is checked and the latest image to be categorized using metadata as a "portrait" by the database or a user is selected. If an image with metadata matching a "portrait" type is found, the image is checked using a face detection modality to determine if the category with the highest percentage of confidence (or above a predetermined confidence threshold) is "person," or "people," which helps to filter out images that are of, e.g., a landscape or an inanimate object. Only images classified in this manner as pertaining to a person are utilized in embodiments.

Such a model may be a clustering and/or classification model per U.S. Pat. No. 10,318,846, granted on Jun. 11, 2019, which is incorporated in its entirety herein by reference. For instance, the system and method embodiments of the disclosure may utilize a convolutional neural network ("CNN") trained on labeled historical documents and/or other images with a feature classifier that is iteratively trained by manually labeling historical images to provide labels to an input image, such as "people," "portrait," "painting," "man on horse," etc.

These labels may be utilized by the embodiments to determine whether an image identified in the gallery of a tree person in a candidate lineage is suitable for retrieval, transformation, and arrangement as described herein. In embodiments, only those images labeled as pertaining to "people," "person," or "portrait" (and related tags) may be selected for retrieval, transformation, and arrangement. For example, images that have been passed to or checked against the aforementioned classification model may receive a confidence score therefrom and associated with one or more tags identified for the image. Images above a predetermined confidence threshold for pertaining to a person or persons may be retained, while images below the predetermined confidence threshold may be excluded.

Images need not be saved to or associated with a gallery section of a profile, but rather may be identified in any suitable manner, e.g. by utilizing a cluster of a stitched tree database to search galleries of clustered-together nodes, identifying a record or image within a record collection based on, e.g., a name associated with a node, or in any other suitable fashion. Such images identified from clusters of a stitched tree database may likewise be determined to be of a face using a classification model or other suitable modality such as a machine-learning modality. This may advantageously facilitate access to and the use of a greater corpus of records, such as images, of persons of interest in candidate lineages than would be possible absent the use of a specialized stitched tree database.

Step 708 includes prioritizing or selecting a candidate lineage of the plurality of candidate lineages. This may be performed based on the quality of images, number and/or closeness of generations, or other factors. For example, a lineage or a subset of a lineage that a user has already saved or dismissed may be filtered out. In embodiments, lineages containing the highest number of qualifying images will be prioritized. The step 708 may be performed by, for example, using an image-arrangement template to determine a most-fitting candidate lineage. The image-arrangement template may be selected in advance or on-the-fly, and may include a number of image spaces, roles (such as parent, grandparent, etc.) for the image spaces, or other characteristics that facilitate determining a most-fitting candidate lineage.

For example, the system may select an image-arrangement template prior to identifying candidate lineages, and which the candidate lineages are based on. An image-arrangement template of a 2×2 grid of images requiring members of four consecutive or increasing generations of a direct ancestral line, for example, can be used to generate candidate lineages that meet the template requirements and/or to judge a plurality of generated and/or predetermined candidate lineages against how well the nodes and associated images of the candidate lineages meet the template requirements. In addition to assessing whether and how well a candidate lineage with its associated nodes and images meets the requirements of the template, the images may be assessed to determine image quality, confidence that the images pertain to a face, image similarity, image color, and/or any other suitable metric or quality. Candidate lineages may receive a score based on one or more of the above-mentioned features which may be weighted, and a candidate lineage with a highest score may be selected.

Candidate lineages from different image-arrangement templates may be compared and an optimal candidate lineage selected so as to provide the most-engaging user experience. This may be performed based on a metric such as greatest number of valid (e.g., verified as containing a face and suitable inclusion in a particular image-arrangement template) images and/or fewest gaps between generations (for a generational image-arrangement template). Number of valid images may be a first metric, and generation gaps may be a second metric. In other words, in embodiments, a candidate lineage from any image-arrangement template having a greatest number of valid images may be prioritized over any candidate lineage from any other image-arrangement template having fewer valid images.

Where two candidate lineages have a same or substantially same number of valid images, a candidate lineage with a smallest number of gaps between generations may be prioritized. For example, a candidate lineage of a generational image arrangement that progresses directly from self to mother to grandmother (mother's mother) and then to great-grandmother (mother's mother's mother), which has no generation gaps, is prioritized over a candidate lineage that progresses from self to mother to great-grandmother (mother's mother's mother) to great-great-grandmother (mother's mother's mother), which has a single generation gap.

The selection of a candidate lineage may also or alternatively be performed based on a prioritization among image-arrangement templates. That is, a preferred candidate lineage of a generational image-arrangement template may be selected for a user over a preferred candidate lineage of a self+siblings image-arrangement template, other factors being equal or substantially equal, or even if a greater number of valid images is identified for the candidate lineage of the self+siblings image-arrangement template. This may be based on a predetermined hierarchy of image-arrangement templates, based on interests, actions, or family-tree status of the user, and/or any suitable factor.

This may, yet further, also or alternatively be performed based on a previously generated and/or accepted image arrangement for a particular user. It has been found that novelty and emotional engagement for a user are maximized by prioritizing different image-arrangement templates on subsequent image arrangement generation instances for a particular user.

In other words, the system may identify, for a particular user, a plurality of candidate lineages for a generational image-arrangement template, and select, transform, and display a corresponding image arrangement for a top candidate lineage to the user. Another, e.g. second-most appropriate, candidate lineage for the generational image-arrangement template may be generated and displayed to the user only after selecting, transforming, and displaying a top-most candidate lineage for a different image-arrangement template, such as a self+siblings image-arrangement template. This may be performed even if a number and/or quality of images associated with the second-most appropriate candidate lineage of the generational image-arrangement template is greater than the number and/or quality of images associated with the top-most candidate lineage of the self+siblings image-arrangement template. This advantageously maximizes novelty for and emotional engagement by the user.

In another example, a user may have greater than three siblings represented in their family tree, all of whom have associated, valid images. Candidate linages representing multiple respective combinations of siblings may be generated for a self+siblings image-arrangement template having a 2×2 grid of images. In embodiments, in between generating and displaying self+siblings image arrangements to such a user, the system may intersperse a generational image arrangement, even if the generational image arrangement has fewer valid images than the subsequent self+sibling image arrangement. This likewise maximizes novelty for and emotional engagement by the user.

A step 710 includes transforming the images into an image arrangement by generating an image arrangement using a predetermined template using the transformed images from the prioritized candidate lineage. The step 710 may include generating or modifying the image arrangement based on one or more predetermined and/or user-specified settings. This may include, in embodiments, transforming one or more images as necessary by cropping, centering, scaling, and/or performing other adjustments. For example, the face detection model may be used to automatically center the image on the tree node person's face and to crop therearound based on a threshold determined from the predefined template and/or based on other retrieved images. Cropping, sizing, centering, and/or scaling may be performed such that one or more, in embodiments all, faces within the image-arrangement template are a same or substantially the same size, and/or such that the faces within the image-arrangement template match in any other suitable fashion.

A shape of an image may be adjusted based on a shape of an image space and/or image-arrangement template. For images with user-defined cropping rectangles, the cropping operation is performed by a Media Service when the image is requested; in embodiments, if no user-defined cropping rectangle exists, face detection modalities and/or other suitable tools are used to center the image on the pertinent person's face. Such tools may include, e.g., the Apple Vision Framework available from Apple, Inc. of Cupertino, CA.

The step 712 may additionally or alternatively include sorting the obtained images by generation and/or age and/or any other suitable characteristic. For example, the obtained images may be sorted according to a predetermined template arrangement, such that the obtained images are to be ordered from oldest generation to youngest generation of a direct ancestral line, or sorted into discrete sides of a family tree, or otherwise as suitable.

For example, it may be automatedly determined or specified by a user to perform one or more color- or image restoration-specific actions on one or more of the images. For instance, the system or the user may determine that one or more of the images in the image arrangement is a different color or color scheme than other images, with one image being in the full color and three other images being in sepia tone. The system may automatically adjust a color of the sepia images or the full-color image to match the other image(s) using a suitable colorization or re-colorization modality, such as an artificial neural network, in embodiments a suitable generative adversarial network, so as to normalize a color scheme in the image arrangement.

A step 712 includes sending the image arrangement to a user, such as a user device, saving the image arrangement, and/or causing a device, such as a user device, to display the image arrangement, such as including the image arrangement as a card in a daily feed of a mobile app relating to the genealogical research service on a user's device.

In embodiments, the image arrangement embodiments including image identification, retrieval, transformation, and arrangement are not limited to direct-line ancestors for a self, but rather may also include an image arrangement according to principles of the embodiments for downstream generations, i.e. children, grandchildren, great-grandchildren. The image arrangements may be generated for mixed-sex lineages, mixing for example a male self, mother, maternal grandfather, and maternal grandfather's mother. The image arrangements may include tree persons who are not direct-line ancestors, such as aunts, uncles, cousins, etc. Image arrangements may likewise be generated for a partner and/or for children. For example, a mix of upstream and downstream generations and/or biological sexes may be included in an image arrangement, including a male self, a male child, the self's mother, and the mother's father.

In embodiments, an image arrangement may be generated for a user automatedly. In other embodiments, the image arrangement may be generated for a user iteratively and based at least in part on the user's input and preferences. For example, a user may specify a base or starting node as the user themselves or as another person, e.g. a person of interest, such as a relative, or otherwise. The user may accept or reject a proposed image for one or more persons in the image arrangement, including selecting a different image from a media gallery of a respective person's profile, uploading or searching for and selecting a different image, e.g. from a record collection, or otherwise. The process may be cooperative, with the user being prompted by the system to specify one or more persons of an image arrangement template that is partially or substantially complete when it is presented to the user; or the user may be prompted to generate the image arrangement "from scratch."

The user may also accept, reject, or otherwise specify persons to be included in the image arrangement. While a predetermined template and tree persons to be included in the template may be proposed and presented to the user, the user may accept, reject, or otherwise specify tree persons, templates, and arrangements thereof. For instance, a user may utilize embodiments to iteratively generate an image arrangement with a desired number of individuals, a desired selection of images or other data corresponding thereto, and a desired arrangement of the images, including a desired shape, size, and order of images. The user may select from one or more predetermined templates of image arrangements or generate and arrange the arrangement for the images on their own, e.g. using a suitable graphical user interface.

For example, a user in an onboarding process of initial tree building and genealogical research may be presented with a basic template labeled with self, parent(s), and/or grandparent(s) nodes, with icons allowing a user to upload, search for, and/or select images to associate therewith in an image arrangement. The system and/or user may access DNA-related data or findings, such as traits predictions or match information including number of centimorgans shared with other persons, for determining which persons to include in an image arrangement.

In an embodiment, an image arrangement may be generated according to the above-described embodiments, with one or more of the component images animated using a suitable face-animation modality. The animation of the one or more component images may be performed using an artificial intelligence modality, such as an artificial neural network. This may be performed as described in US Patent Application Publication No. 2022/0020195, published Mar. 15, 2022, the contents of which are incorporated herein in their entirety by reference.

In such an image arrangement embodiment, the artificial neural network and/or other modality may be configured or adapted to control one or more of the animated images to act in concert with each other. For example, the faces in the images may be modified so as to "look" at each other, make eye contact with each other, or to "look" in a certain direction. In an embodiment, the image arrangement comprises as a base or starter node an image of the user, as shown in FIG. 1, and the other images of the image arrangement are configured to look and smile at the user's image, located in the bottom-right slot of the image arrangement, with filial affection and pride. This may advantageously allow the images of the image arrangement to create a dynamic and engaging user experience that allows a user to feel connected with the individuals whose images are included in the image arrangement. Further, the user may, in embodiments, be able to specify a movement, gesture, expression, or other action by one or more of the images, giving the user further control and specificity over their recollection of and connection with the people whose images are included in the image arrangement.

In embodiments, the animation of one or more faces may be applied without creating an ongoing animation but instead to edit an image such that a subject thereof is shown in a desired pose, such as a pose similar to other images in the image arrangement.

In other embodiments, the image arrangement is configured to comprise images of a plurality of members of a user's family or other persons of interest, arranged according to the user's specification and/or according to a predetermined template. One or a plurality, including all, of the images in the image arrangement may be configured to look at the image corresponding to the user or in any other suitable direction and manner. A default setting may include a randomized interaction mode where the individual images in the image arrangement are configured to make random eye contact with each other, periodically smile at each other, and act as if they are in conversation with each other, such as would be observed in an in-person gathering of such individuals. This facilitates a simulated family gathering that often is not possible in the real world.

In embodiments such as the embodiment of FIG. 3B, where the left-most image is not the same size as the images on the right side, the system and method embodiments may be configured to adapt the face animation controls to accommodate differences in sizes of the images and distances of the images from each other. That is, the image on the left of FIG. 3B may be adjusted so as to make eye contact with, smile at, and otherwise interact with the images on the right side of FIG. 3B while accounting for the differences in size of the images and faces therein. In other embodiments, the predetermined templates are biased toward templates with images of a substantially same size and symmetrical arrangement relative to a center of the image arrangement.

Additional media may be added to or included with the image arrangement. For example, a user may specify music to include with the image arrangement or music may be automatedly selected, and the actions of the images in the image arrangement may be adapted to the music. Filters may be applied to the image arrangement, such as by adjusting, automatedly or by specification of the user, a color of one or more aspects of the image arrangement, a clothing article (such as having each of the persons in the image arrangement "wear" a matching shirt or hat), or make an action or gesture in unison. This advantageously allows for a user to generate group images of family or persons of interest and/or to experience a family reunion that is not possible in person.

One or more of the persons in the image arrangement may be configured to speak a predetermined or user-specified word or words. In embodiments, a model configured to imitate a person's voice may be utilized, or stock voices may be used to give voice to the images in the image arrangement. For example, the model may be trained based on audio or video recordings of a person, either uploaded by a user or retrieved from the genealogy database.

Figure 8:
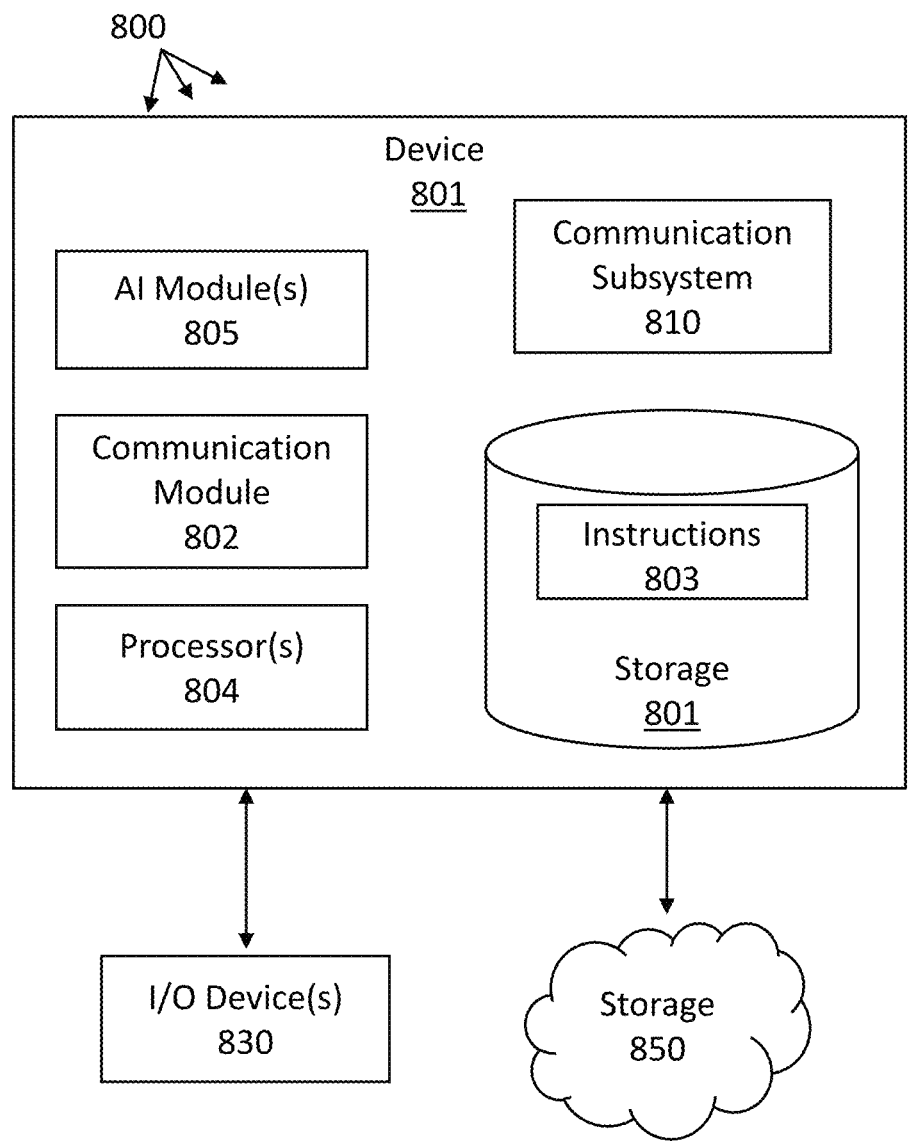
FIG. 8 is a diagram of a computer system for image identification, retrieval, transformation, and arrangement according to the present disclosure.

FIG. 8 illustrates an example computer system 800 comprising various hardware elements, in accordance with some embodiments of the present disclosure. The computer system 800 may be incorporated into or integrated with devices described herein and/or may be configured to perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, the computer system 800 includes a communication module 802, one or more processor(s) 804, one or more input and/or output device(s) 830, and a storage 801 comprising instructions 803 for implementing an image identification, retrieval, transformation, and arrangement system and/or method according to the disclosure. The computer system 800 may be implemented using various hardware implementations and embedded system technologies. For example, one or more elements of the computer system 800 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of the computer system 800 may be communicatively coupled via the communication module 802. While the communication module 802 is illustrated as a single connection for purposes of clarity, it should be understood that the communication module 802 may include various numbers and types of communication media for transferring data between pertinent components such as hardware elements. For example, the communication module 802 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, the communication medium 802 may include one or more buses connecting pins of the hardware elements of the computer system 800. For example, the communication medium 802 may include a bus that connects the processor(s) 804 with the storage 801, referred to as a system bus, and a bus that connects the storage 801 with the input device(s) and/or output device(s) 830, referred to as an expansion bus. The system bus may itself consist of several buses, including an address bus, a data bus, and a control bus. The address bus may carry a memory address from the processor(s) 804 to the address bus circuitry associated with the storage 801 in order for the data bus to access and carry the data contained at the memory address back to the processor(s) 804. The control bus may carry commands from the processor(s) 804 and return status signals from the storage 801. Each bus may include multiple wires for carrying multiple bits of information and each bus may support serial or parallel transmission of data.

The processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal—oxide—semiconductor field-effect transistor (MOSFET) construction. The processor(s) 804 may include one or more multi-core processors, in which each core may read and execute program instructions concurrently with the other cores, increasing speed for programs that support multithreading.

The input device(s) 830 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. The input device(s) 830 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

The output device(s) 830 may include one or more of various devices that convert information into human-readable form, such as without limitation a display device, a speaker, a printer, a haptic or tactile device, and/or the like. The output device(s) 830 may also include devices for writing to removable storage devices or other removable media, such as those described in reference to the input device(s). The output device(s) 830 may also include various actuators for causing physical movement of one or more components. Such actuators may be hydraulic, pneumatic, electric, and may be controlled using control signals generated by the computer system 800.

The communications subsystem 810 may include hardware components for connecting the computer system 800 to systems or devices that are located external to the computer system 800, such as over a computer network. In various embodiments, the communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), combinations thereof, or other suitable possibilities.

The storage 801 may include the various data storage devices of the computer system 800. For example, the storage 801 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While the processor(s) 804 and the storage 801 are illustrated as being separate elements, it should be understood that the processor(s) 804 may include varying levels of on-processor memory, such as processor registers and caches that may be utilized by a single processor or shared between multiple processors.

The storage 801 may include a main memory, which may be directly accessible by the processor(s) 804 via the memory bus of the communication module 802. For example, the processor(s) 804 may continuously read and execute instructions stored in the main memory. As such, various software elements may be loaded into the main memory so as to be read and executed by the processor(s) 804 as illustrated in FIG. 8. Typically, the main memory is volatile memory, which loses all data when power is turned off and accordingly needs power to preserve stored data.

The main memory may further include a small portion of non-volatile memory containing software (e.g., firmware, such as BIOS) that is used for reading other software stored in the storage 801 into the main memory. In some embodiments, the volatile memory of the main memory is implemented as RAM, such as dynamic random-access memory (DRAM), and the non-volatile memory of the main memory is implemented as read-only memory (ROM), such as flash memory, erasable programmable read-only memory (EPROM), or electrically erasable programmable read-only memory (EEPROM).

The computer system 800 may include software elements, shown as being currently located within the main memory, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 803, which are executable by the computer system 800. In one example, such instructions 803 may be received by the computer system 800 using the communications subsystem 810 (e.g., via a wireless or wired signal that carries the instructions 803), carried by the communication module 802 to the storage 801, stored within the storage 801, read into the main memory, and executed by the processor(s) 804 to perform one or more steps of the described methods.

In another example, the instructions 803 may be received by the computer system 800 using the input device(s) 830 (e.g., via a reader for removable media), carried by the communication module 802 to the storage 801, stored within the storage 801, read into the main memory, and executed by the processor(s) 804 to perform one or more steps of the described methods.

In some embodiments of the present disclosure, the instructions 803 are stored on a computer-readable storage medium (or simply computer-readable medium). Such a computer-readable medium may be a hardware storage device that, compared to transmission media or carrier waves, is "non-transitory" and may therefore be referred to as a non-transitory computer-readable medium. In some cases, the non-transitory computer-readable medium may be incorporated within the computer system 800. For example, the non-transitory computer-readable medium may be the storage 801 and/or the cloud storage 850 (as shown in FIG. 8).

In some cases, the non-transitory computer-readable medium may be separate from the computer system 800. In one example, the non-transitory computer-readable medium may be a removable medium provided to the input device(s) 830 (as shown in FIG. 8), such as those described in reference to the input device(s) 830, with the instructions 803 being read into the computer system 800 from the input device(s) 830. In another example, the non-transitory computer-readable medium may be a component of a remote electronic device, such as a mobile phone, that may wirelessly transmit a data signal that carries the instructions 803 to the computer system 800 and that is received by the communications subsystem 810 (as shown in FIG. 8).

The instructions 803 may take any suitable form to be read and/or executed by the computer system 800. For example, the instructions 803 may be source code (written in a human-readable programming language such as Java, C, C++, C#, Python), object code, assembly language, machine code, microcode, executable code, and/or the like. In one example, the instructions 803 are provided to the computer system 800 in the form of source code, and a compiler is used to translate the instructions 803 from source code to machine code, which may then be read into the main memory for execution by the processor(s) 804.

As another example, instructions 803 are provided to the computer system 800 in the form of an executable file with machine code that may immediately be read into the main memory for execution by processor(s) 804. In various examples, the instructions 803 may be provided to the computer system 800 in encrypted or unencrypted form, compressed or uncompressed form, as an installation package or an initialization for a broader software deployment, among other possibilities.

In one aspect of the present disclosure, a system (e.g., the computer system 800) is provided to perform methods in accordance with various embodiments of the present disclosure. For example, some embodiments may include a system comprising one or more processors (e.g., the processor(s) 804) that are communicatively coupled to a non-transitory computer-readable medium (e.g., the storage 801). The non-transitory computer-readable medium may have instructions (e.g., the instructions 803) stored thereon that, when executed by the one or more processors, cause the one or more processors to perform the methods or aspects thereof as described in the various embodiments.

In another aspect of the present disclosure, a computer-program product that includes instructions (e.g., instructions 803) is provided to perform methods in accordance with various embodiments of the present disclosure. The computer-program product may be tangibly embodied in a non-transitory computer-readable medium (e.g., the storage 801). The instructions may be configured to cause one or more processors (e.g., the processor(s) 804) to perform the methods or aspects thereof as described in the various embodiments.

In another aspect of the present disclosure, a non-transitory computer-readable medium (e.g., the storage 801) is provided. The non-transitory computer-readable medium may have instructions (e.g., instructions 803) stored thereon that, when executed by one or more processors (e.g., processor(s) 804), cause the one or more processors to perform the methods or aspects thereof as described in the various embodiments.

By providing an image identification, retrieval, transformation, and arrangement system, method, or computer-program product according to the disclosed embodiments, the problem of existing genealogical research services being poorly adapted to presenting a user with engaging and indelible experiences is advantageously addressed. The image identification, retrieval, transformation, and arrangement embodiments facilitate the automated traversal of a family tree in a genealogical database, such as a stitched tree database, to identify particular images of persons of interest, retrieve and transform the same, and arrange the transformed images into a novel form using one or more predetermined templates or rules to provide enriching and engaging comparisons and gatherings of images of persons of interest. The user's specifications and interests may be incorporated and accounted for by allowing the user to specify a base node, a template, one or more persons of interest, and/or one or more images.

It is to be understood that not necessarily all objects or advantages may be achieved under any embodiment of the disclosure. Those skilled in the art will recognize that the image identification, retrieval, transformation, and arrangement systems and methods may be embodied or carried out, so it achieves or optimizes one advantage or group of advantages as taught herein without necessarily achieving other objects or advantages as taught or suggested herein.

The skilled artisan will recognize the interchangeability of various disclosed features. Besides the variations described, other known equivalents for each feature can be mixed and matched by one of skill in this art to provide or utilize an image identification, retrieval, transformation, and arrangement system and/or method under principles of the present disclosure. It will be understood by the skilled artisan that the features described may apply to other types of data, contexts, and/or models.

Although this disclosure describes certain exemplary embodiments and examples of image identification, retrieval, transformation, and arrangement systems and/or methods, it nevertheless will be understood by those skilled in the art that the present disclosure extends beyond the specifically disclosed embodiments to other alternative embodiments and/or uses of the disclosure and obvious modifications and equivalents thereof. It is intended that the scope of the present disclosure should not be limited by the particular disclosed embodiments described above, and may be extended to other uses, approaches, and contexts navigating a database to identify a datum, retrieve suitable data, and transform the retrieved data to an arrangement as suitable.

The invention claimed is:

1. A computer-implemented method for generating an image arrangement from records in a stitched family tree genealogical database, the computer-implemented method comprising:
   accessing a stitched tree of a person of interest in a genealogical database, the person of interest defining a base node of the stitched tree for generating an image arrangement, wherein the stitched tree is stored in the genealogical database and comprises a plurality of linked nodes corresponding to images stored in the genealogical database;
   generating, from the images corresponding to the stitched tree in the genealogical database, the image arrangement for the base node of the stitched tree by:
      identifying, from the genealogical database, a first image depicting the person of interest corresponding to the base node and a second image depicting a person represented by an additional node connected to the base node in the stitched tree;
      determining that a first confidence associated with a first prediction by a machine learning classification model that the first image comprises a first face is above a predetermined confidence threshold;
      determining that a second confidence associated with a second prediction by the machine learning classification model that the second image comprises a second face is above the predetermined confidence threshold;
      generating, based on the predetermined confidence threshold, a plurality of candidate lineages extending from the base node in the stitched tree;
      selecting, from among the plurality of candidate lineages, a candidate lineage comprising the additional node connected to the base node of the stitched tree;
      traversing the stitched tree along the candidate lineage from the base node to identify, from the genealogical database, the second image depicting the person represented by the additional node along the candidate lineage; and
      transforming the first image and the second image into the image arrangement for the candidate lineage; and
   providing the image arrangement for display on a user device.

2. The computer-implemented method of claim 1, wherein identifying the first image comprises:
   applying the machine learning classification model to the first image; and
   determining, using the machine learning classification model, that the first image comprises a face.

3. The computer-implemented method of claim 1, further comprising transforming a second candidate lineage extending from the base node into a second image arrangement for display on the user device.

4. The computer-implemented method of claim 1, wherein generating the plurality of candidate lineages extending from the base node comprises:

generating a first candidate lineage comprising a first set of nodes extending from the base node; and
generating a second candidate lineage comprising a second set of nodes extending from the base node.

5. The computer-implemented method of claim 1, further comprising:
generating the plurality of candidate lineages comprising respective paths of linked nodes extending from the base node in the stitched tree.

6. The computer-implemented method of claim 5, wherein candidate lineages among the plurality of candidate lineages are based on a template image arrangement.

7. The computer-implemented method of claim 1, wherein transforming the first image and the second image into the image arrangement comprises automatedly adjusting at least one of:
a size and a shape of at least one of the first image and the second image such that faces of the first image and the second image fit corresponding spaces of a template; and
a color scheme of at least one of the first image and the second image such that the first image and the second image have matching color schemes.

8. A computer system comprising:
one or more processors; and
a non-transitory computer-readable medium comprising instructions that, when executed by the one or more processors, cause the computer system to:
access a stitched tree of a person of interest in a genealogical database, the person of interest defining a base node of the stitched tree for generating an image arrangement, wherein the stitched tree is stored in the genealogical database and comprises a plurality of linked nodes corresponding to images stored in the genealogical database;
generate, from the images corresponding to the stitched tree in the genealogical database, the image arrangement for the base node of the stitched tree by:
identifying, from the genealogical database, a first image depicting the person of interest corresponding to the base node and a second image depicting a person represented by an additional node connected to the base node in the stitched tree;
determining that a first confidence associated with a first prediction by a machine learning classification model that the first image comprises a first face is above a predetermined confidence threshold;
determining that a second confidence associated with a second prediction by the machine learning classification model that the second image comprises a second face is above the predetermined confidence threshold;
generating, based on the predetermined confidence threshold, a plurality of candidate lineages extending from the base node in the stitched tree;
selecting, from among the plurality of candidate lineages, a candidate lineage comprising the additional node connected to the base node of the stitched tree;
traversing the stitched tree along the candidate lineage from the base node to identify, from the genealogical database, the second image depicting the person represented by the additional node along the candidate lineage; and
transforming the first image and the second image into the image arrangement for the candidate lineage; and
provide the image arrangement for display on a user device.

9. The computer system of claim 8, wherein the instructions are further executable by the one or more processors to cause the computer system to:
apply the machine learning classification model to the first image and the second image; and
determine, using the machine learning classification model, that the first image comprises a first face and the second image comprises a second face.

10. The computer system of claim 8, wherein the instructions are further executable to cause the computer system to transform a second candidate lineage extending from the base node into a second image arrangement for display on the user device.

11. The computer system of claim 8, wherein the instructions are further executable by the one or more processors to cause the computer system to generate the plurality of candidate lineages extending from the base node by:
generating a first candidate lineage comprising a first set of nodes extending from the base node; and
generating a second candidate lineage comprising a second set of nodes extending from the base node.

12. The computer system of claim 8, wherein the instructions are further executable by the one or more processors to cause the computer system to:
generate the plurality of candidate lineages comprising respective paths of linked nodes extending from the base node in the stitched tree.

13. The computer system of claim 12, wherein candidate lineages among the plurality of candidate lineages are based on a template image arrangement.

14. The computer system of claim 8, wherein the instructions are further executable to cause the computer system to transform the first image and the second image into the image arrangement for the candidate lineage by automatedly adjusting at least one of:
a size and a shape of at least one of the first image and the second image such that faces of the first image and the second image fit corresponding spaces of a template; and
a color scheme of at least one of the first image and the second image such that the first image and the second image have matching color schemes.

15. A non-transitory computer-readable medium comprising instructions that, when executed by one or more processors of a computer system, cause the computer system to:
access a stitched tree of a person of interest in a genealogical database, the person of interest defining a base node of the stitched tree for generating an image arrangement, wherein the stitched tree is stored in the genealogical database and comprises a plurality of linked nodes corresponding to images stored in the genealogical database;
generate, from the images corresponding to the stitched tree in the genealogical database, the image arrangement for the base node of the stitched tree by:
identifying, from the genealogical database, a first image depicting the person of interest corresponding to the base node and a second image depicting a person represented by an additional node connected to the base node in the stitched tree;
determining that a first confidence associated with a first prediction by a machine learning classification model that the first image comprises a first face is above a predetermined confidence threshold;

determining that a second confidence associated with a second prediction by the machine learning classification model that the second image comprises a second face is above the predetermined confidence threshold;

generating, based on the predetermined confidence threshold, a plurality of candidate lineages extending from the base node in the stitched tree;

selecting, from among the plurality of candidate lineages, a candidate lineage comprising the additional node connected to the base node of the stitched tree;

traversing the stitched tree along the candidate lineage from the base node to identify, from the genealogical database, the second image depicting the person represented by the additional node along the candidate lineage; and transforming the first image and the second image into the image arrangement for the candidate lineage; and provide the image arrangement for display on a user device.

16. The non-transitory computer-readable medium of claim 15, wherein the instructions are further executable by the one or more processors to cause the computer system to:
apply the machine learning classification model to the first image and the second image; and
determine, using the machine learning classification model, that the first image comprises a first face and the second image comprises a second face.

17. The non-transitory computer-readable medium of claim 15, wherein the instructions are further executable by the one or more processors to cause the computer system to transform a second candidate lineage extending from the base node into a second image arrangement for display on the user device.

18. The non-transitory computer-readable medium of claim 15, wherein the instructions are further executable by the one or more processors to cause the computer system to:
generate the plurality of candidate lineages comprising respective paths of linked nodes extending from the base node in the stitched tree.

19. The non-transitory computer-readable medium of claim 18, wherein candidate lineages among the plurality of candidate lineages are based on a template image arrangement.

20. The non-transitory computer-readable medium of claim 15, wherein the instructions are further executable by the one or more processors to cause the computer system to transform the first image and the second image into the image arrangement for the candidate lineage by automatedly adjusting at least one of:
a size and a shape of at least one of the first image and the second image such that faces of the first image and the second image fit corresponding spaces of a template; and
a color scheme of at least one of the first image and the second image such that the first image and the second image have matching color schemes.

* * * * *